United States Patent Office 3,543,581
Patented Dec. 1, 1970

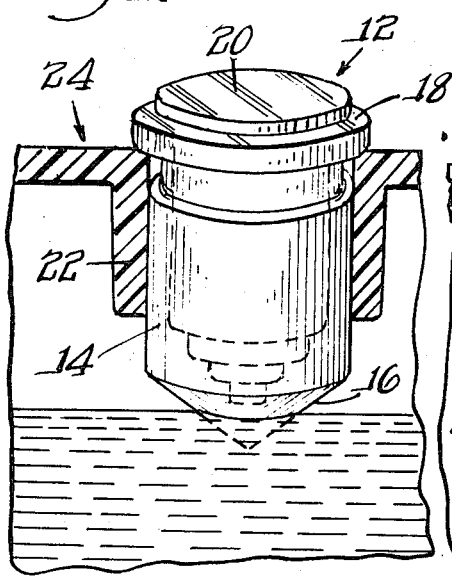
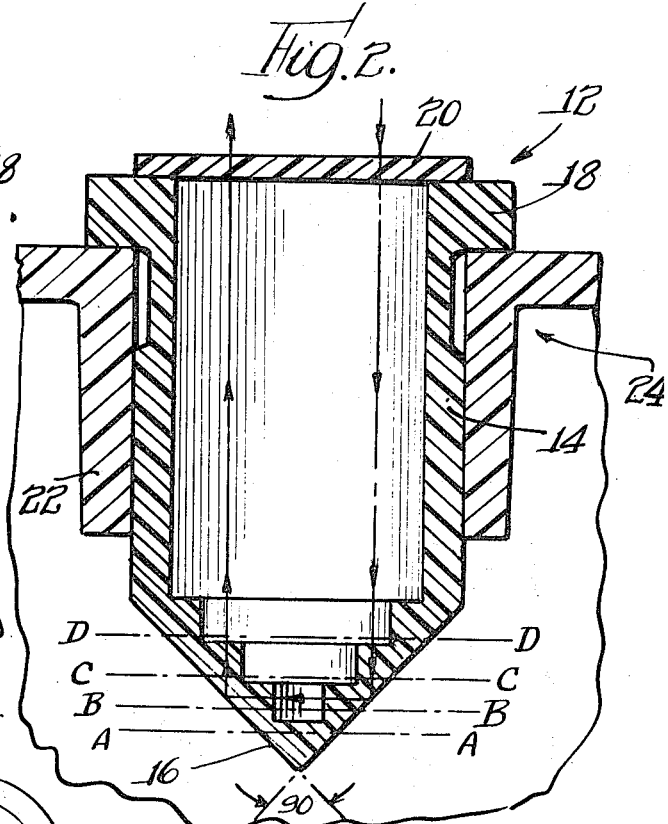
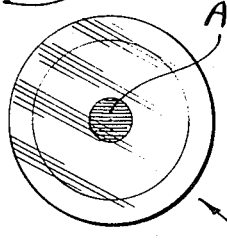
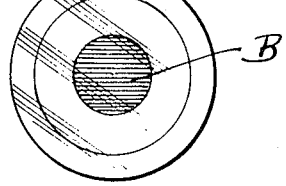
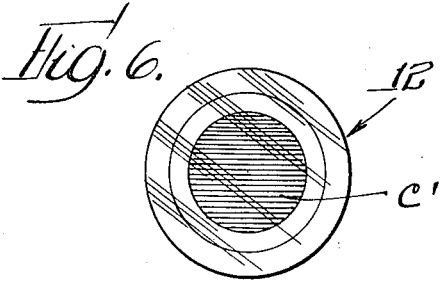
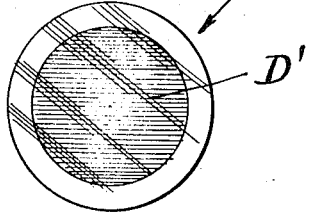

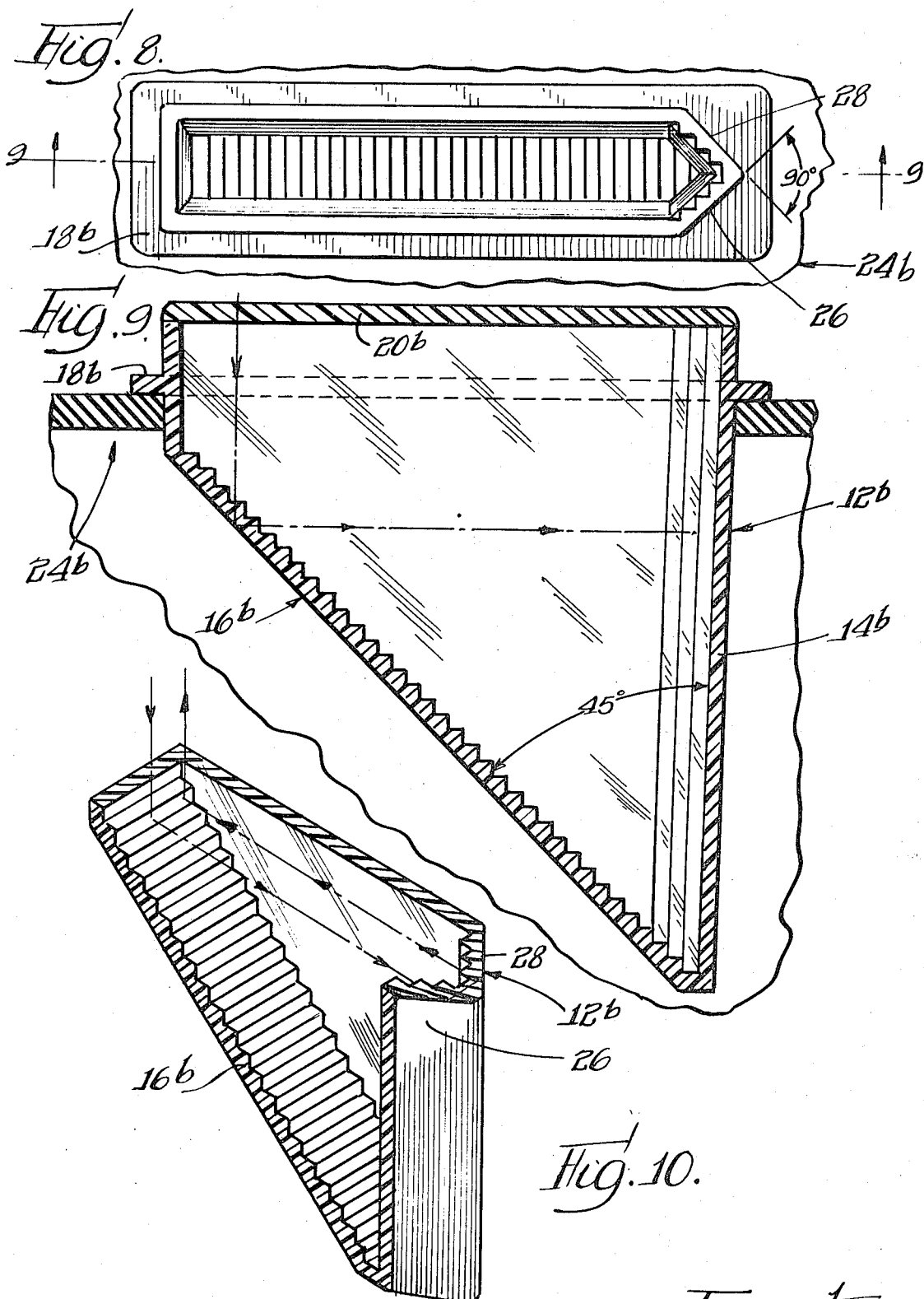

3,543,581
LIQUID LEVEL INDICATOR
Francis E. Ryder, Island Lake, Ill., assignor to Illinois Tool Works Inc., Chicago, Ill., a corporation of Delaware
Filed Feb. 6, 1969, Ser. No. 797,141
Int. Cl. G01f 23/02
U.S. Cl. 73—327                                   7 Claims

ABSTRACT OF THE DISCLOSURE

The present invention relates generally to liquid level indicators adapted to be mounted in the upper wall of a liquid container, as for example the upper wall of a conventional storage battery. The embodiments of the invention disclosed in the present application include a relatively thin-walled hollow element formed of suitable light receiving and reflecting material adapted to depend from the upper wall of a container into a body of liquid within the container. This relatively thin-walled hollow container is adapted to receive light from the upper extremity thereof and to direct such light downwardly into association with angularly disposed light receiving and reflecting surface means. Portions of the angularly disposed light receiving and reflecting means not immersed within the liquid will reflect light back to the upper light receiving portion of the member. Portions thereof immersed within the liquid will not reflect light rays back to the upper light receiving area and hence the level of the liquid may be visually determined by observing the extent to which the upper light receiving area is light or dark in shade.

---

Heretofore acrylic resins such as methomethacrylate have been employed in the fabrication of liquid level indicators. While such materials are chemically resistant to certain liquids, they will not resist the corrosive effect of other liquids, such as certain liquids now in common use in storage batteries. Certain plastic materials chemically resistant to such other liquids do not lend themselves to be molded in relatively thick sections because, in thick sections, the material does not provide the required degree of clarity for use as a liquid level indicator. Hence the present invention contemplates the use of liquid level indicators which may be molded in relatively thin sections.

More specifically, the present invention contemplates the provision of liquid level indicators of chemically resistant materials in one piece and conformed or molded in one piece and consisting of relatively thin wall portions.

Still more specifically the present invention contemplates liquid level indicators of the type referred to above which are hollow and so fabricated as to permit light rays from the upper portion thereof to be directed downwardly and reflected back to give indication of the position of the level of the liquid in a container.

It is also an object of the present invention to provide liquid level indicators which are not only very efficient in receiving and reflecting light rays but which may be very economically produced.

The foregoing and other objects and advantages will be more apparent from the following detailed description, when considered in connection with the accompanying drawings, wherein:

FIG. 1 is a perspective view of a liquid level indicator which is representative of one embodiment of the present invention, said indicator being shown in operative association with the upper wall of a liquid container, such as a storage battery;

FIG. 2 is an enlarged central vertical sectional view of the indicator shown in FIG. 1;

FIG. 3 is a vertical sectional view similar to FIG. 2 of a modified liquid level indicator of the threaded type, capable of being received by complementary thread convolutions within the upper wall of a liquid container;

FIG. 4 illustrates the extent of the shaded portion of the upper surface of the indicator which will be apparent when the liquid level within the container is defined by the dot-and-dash line A of FIG. 2;

FIGS. 5, 6 and 7 are similar to FIG. 4, illustrating the extent of the shaded portions when the liquid levels are defined respectively by the dot-and-dash lines B, C and D of FIG. 2;

FIG. 8 is a plan view of a liquid level indicator of modified noncircular form;

FIG. 9 is a vertical sectional view taken substantially along the line 9—9 of FIG. 8; and FIG. 10 is a fragmentary perspective view of the liquid level indicator illustrated in FIGS. 8 and 9, with the front wall and upper wall removed to disclose structures otherwise hidden.

Referring now to the drawings more in detail, wherein like numerals have been employed to designate similar parts throughout the various views, it will be seen that the liquid level indicator in FIGS. 1 and 2 is indicated generally by the numeral 12. The indicator 12 includes a hollow, cylindrical body portion 14, a lower conical tip extremity 16 and an upper flange portion 18. A closure disc member 20 is permanently adhered to the upper surface of the flange 18. It should be understood that the optical characteristics of the closure disc 20 are identical with the optical characteristics of the member to which it is attached. The cylindrical section of the indicator 12 is adapted for snug fitting within a depending flange 22 of the upper wall of a suitable container or storage battery designated generally by the numeral 24.

The included angle of the conical tip 16 is 90° and therefore, any light rays passing downwardly through the cap 20 as indicated by the arrow lines in FIG. 2, may be received by the conical surface and deflected horizontally to the oppositely disposed portion of the conical surface and then reflected upwardly to the cap 20. This assumes, of course, that the portion of the conical surface receiving and reflecting the light rays is not immersed within the liquid of the container 24. Attention is also directed to the stepped contour of the interior surface of the conical tip section 16. These stepped areas are formed by horizontal surfaces intersecting with vertically disposed cylindrical surfaces. Hence by this arrangement, the inner surface areas of the hollow body do not interfere with the transmission of light rays downwardly, across and upwardly, in the manner previously described. Any portion of the conical tip section 16 immersed within the body of liquid of the container will prevent the reflection of light rays. Hence such portion will be indicated by a complementary shaded portion in the cap 20.

To more clearly illustrate the above, FIGS. 4–7 inclusive, are shown in the drawings. FIG. 4 illustrates a dark portion designated by the letter A'. Thus, if the liquid level within the container is defined by the dot-and-dash line A, the darkened area A' will appear on the cap 20 when viewed from above. The remaining exposed surface of the cap will receive light reflected by the peripheral portion of the body which is not immersed within the liquid. Similarly, in FIGS. 5, 6 and 7, corresponding darkened or shaded areas B', C' and D' will appear when the levels of the liquid are defined respectively by the dot-and-dash lines B, C and D of FIG. 2. Obviously when the lower extremity of the cylindrical portion 14 becomes completely immersed within the liquid, a darkened area corresponding to the diameter of the section 14 will appear on the cap 20, when viewed from above.

In FIG. 3 a slightly modified form of liquid level indicator is disclosed and is designated generally by the numeral 12a. The significant structural difference between the indicator 12a and the previously described indicator 12 is that the indicator 12a is provided with external thread convolutions adapted to be received by complementary thread convolutions within the anual depeending collar or section 22a of the container 24a. It will also be noted that the indicator 12a extends above the flange 18a and is provided with a cap 20a which functions similarly to the previously described cap 20. Other parts of the indicator 12a corresponding structurally with the parts of the previously described indicator 12 are indicated by corresponding numerals bearing the suffix a. The indicator 12a is particularly adapted for application to storage batteries equipped with threaded closure members. Other batteries are equipped to accommodate plug type closure members and the indicators shown in FIGS. 1 and 2 are applicable in such instances.

FIGS. 8, 9 and 10 disclose a modified hollow, non-circular liquid level indicator designated generally by the numeral 12b. This embodiment is generally polygonal in horizontal cross-section, as may be ascertained from FIG. 8. As viewed in vertical section, FIG. 9, the liquid level indicator 12b is substantially triangular shape and includes a body section 14b. The level indicator 12b, like the previously described indicators 12 and 12a, is of hollow form and thus provides relatively thin wall sections. FIG. 8 disclosed a plan view of the indicator 12b with the cap or closure member 20b removed, more clearly to disclose the stepped interior of the indicator. In FIG. 9 the indicator 12b is shown in association with a liquid container such as a conventional storage battery 24b. One exterior edge surface 16b is disposed at 45° with respect to the horizontal; in other words, 45° with respect to the upper, exposed, level indicating surface of the container 24b. The opposite edge surface of the body 14b is vertical and includes a pair of surfaces 26 disposed at 90° with respect to each other.

The interior contour of the walls which define the surfaces 26 and 28 is stepped in such a manner as to permit light rays reflected from the surface 16b to be directed to the surfaces 26 and 28 as clearly illustrated in FIG. 10. In other words, by having the steps formed by vertical surfaces extending at right angles to each other the light rays reflected from the surface 16b are not deflected before reaching the surfaces 26 and 28. Light rays received by the surface 26 from the surface 16b are reflected or deflected to the surface 28 and from this surface such rays are reflected back to the surface 16b as clearly illustrated in FIG. 10. It will also be noted that the surfaces which form the steps adjacent the surface 16b present a plurality of horizontal and vertical surfaces extending at right angles to each other. In this manner, unimpaired reception and reflection of light rays as previously described is assured.

A flange 18b serves to engage the upper surface of the container or storage battery 24b as clearly shown in FIG. 9. The extent of light or dark shades observed on the upper surface of the cap 20b will depend upon the extent to which the indicator 12b is immersed within the liquid of the continer 24b. If the container is completely filled with liquid, the entire upper surface of the cap 20b will be dark in shade and likewise, as the level of the liquid within the container becomes lower, a lighter or brighter shade will appear beginning at the left extremity of the cap 20b as viewed in FIG. 9. If the level of the liquid extends to a point below the lower tip of the indicator 12b no dark shade of color will appear on the cap 20b. The cap 20b, like the previously described caps 20 and 20a, must be optically compatible with the material of the indicator body.

From the foregoing, it will be apparent that the present invention enables the production of liquid level indicators from relatively thin plastic stock. Thus the present invention makes it possible to produce liquid level indicators of such materials as nylon, which is a polyamide, or a material such as polypropylene. Such materials resist the corrosive effect of certain chemicals more effectively than acrylic resins referred to above. However, such materials as nylon and the like do not possess the quality of clarity of acrylic resins and hence cannot be used effectively in relatively thick sections. The present invention also makes it possible to employ relatively thin sections of plastic material with a high degree of efficiency. Also, a liquid level indicator constructed in accordance with the teachings of the present invention may be produced economically. As previously mentioned, the smooth outer surfaces in the various modifications of liquid level indicators disclosed herein, coupled with the stepped interior wall assures the effectiveness of the relatively thin wall sections.

Obviously the cap used in association with the main body of the indicator must be optically compatible with the material with which it is associated. In FIGS. 1–3 inclusive, indicators of the cylindrical type are shown wherein the level of the liquid within a container is determined by the size of the darkened circular area when viewed from above the indictor cap, and in FIGS. 8–10 inclusive the level of the liquid is indicated in a rectangular form, appearing along the outer surface of the indicator cap or upper body wall.

The invention is claimed as follows:

1. A level indicator for indicating levels of liquid subject to fluctuation, comprising a member of light transmitting material having a hollow body section defined by relatively thin walls, said body section including a lower portion immersible within liquid and an upper portion providing an exposed liquid level indicating surface, one side of said hollow body section providing a pair of vertically disposed intersecting flat peripheral surfaces having an included angle of 90°, the opposite side of said indicator body having a flat peripheral surface inclined at an angle of 45° with respect to the exposed liquid level indicating surface and terminating in the vicinity of the lower extremity of said vertically disposed intersecting surfaces, the interior surfaces of the walls defining said intersecting surfaces and said inclined surface having a contour which will counteract deflection of light rays received and reflected by said intersecting and inclined surfaces, said intersecting and inclined surface being so disposed with respect to said upper level indicating surface as to receive and reflect light on only the portion of these surfaces located above the level of an associated body of liquid, wherein the contour of the interior surfaces of the walls defining the intersecting surfaces and inclined surface is in the nature of steps, each step having an included angle of 90°.

2. A level indicator for indicating levels of liquid subject to fluctuation as set forth in claim 1, wherein the hollow body section is substantially polygonal in horizontal cross-section.

3. A level indicator for indicating levels of liquid subject to fluctuation as set forth in claim 1, wherein the steps adjacent the intersecting surfaces are defined by intersecting vertical surfaces and the steps adjacent the inclined surface are defined by intersecting vertical and horizontal surfaces.

4. A level indicator for indicating levels of liquid subject to fluctuation, comprising a unitary member of light transmitting material having a cylindrical hollow body section defined by relatively thin walls, said body section including an upper portion providing an exposed liquid level indicating surface, a lower conical extremity integrally formed with the body section, said conical extremity being hollow with substantially thin walls from the apex of the extremity to the juncture of the extremity with the cylindrical body section, the outer surface of the conical extremity comprising smooth intersecting surfaces having an included angle of 90° when viewed in a vertical cross section, said conical extremity having an interior surface in the inner wall of the extremity for enabling light to be doubly reflected from the outer conical surface and including a plurality of step means therein to provide an accurate representation on the indicating surface of the level of liquid, the step means providing non-interfering transmission of the light from the indicating surface to the smooth intersecting surface, whereby light is received though the indicating surface and reflected back to provide a lighted surface area proportional to the level of an associated body of liquid.

5. A level indicator for indicating levels of liquid subject to fluctuation as set forth in claim 4, wherein the step means includes intersecting horizontal and vertical surfaces, which vertical surfaces of the step means are vertically disposed cylindrical surfaces.

6. A level indicator for indicating levels of liquid subject to fluctuaion as set forth in claim 4, wherein peripheral flange means is provided for mounting the indicator upon the upper surface of a container.

7. A level indicator for indicating levels of liquid subject to fluctuation as set forth in claim 6, wherein the upper portion of the hollow body section includes thread means for engaging with complementary means in a container, said thread means being located below the peripheral flange means, the upper portion of the hollow body section also including a segment extending above the peripheral flange means.

References Cited
UNITED STATES PATENTS

| | | | |
|---|---|---|---|
| 2,921,552 | 1/1960 | Miller | 73—327 |
| 2,554,557 | 5/1951 | Brown et al. | 73—327 |
| 2,665,327 | 1/1954 | Martin | 73—327 |
| 3,273,267 | 1/1966 | Willman | 73—327 |
| 3,417,614 | 2/1966 | Ryder | 73—327 |
| 3,417,615 | 4/1967 | Ryder | 73—327 |

FOREIGN PATENTS 1,051,370  10/1950  France.

LOUIS R. PRINCE, Primary Examiner

D. M. YASICH, Assistant Examiner

U.S. Cl. X.R.

136—182